(12) United States Patent
Moore et al.

(10) Patent No.: US 6,605,390 B1
(45) Date of Patent: Aug. 12, 2003

(54) LITHIUM ION BATTERY UTILIZING CARBON FOAM ELECTRODES

(75) Inventors: Thomas S Moore, Oxford, MI (US); Subimal Dinda, W. Bloomfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/786,923

(22) PCT Filed: Sep. 10, 1999

(86) PCT No.: PCT/US99/20918

§ 371 (c)(1),
(2), (4) Date: Aug. 8, 2001

(87) PCT Pub. No.: WO00/16418

PCT Pub. Date: Mar. 23, 2000

(51) Int. Cl.[7] .................................................. H01M 4/58
(52) U.S. Cl. .............................. 429/231.8; 429/231.95; 429/249; 429/209
(58) Field of Search ........................ 429/231.8, 231.95, 429/249, 209

(56) References Cited

U.S. PATENT DOCUMENTS 5,268,395 A * 12/1993 Simandl et al. ............. 521/142
5,426,006 A * 6/1995 Delnick et al. ............. 429/218

* cited by examiner

Primary Examiner—Patrick Ryan
Assistant Examiner—Angela J Martin
(74) Attorney, Agent, or Firm—Ralph E. Smith

(57) ABSTRACT

A lithium ion battery (200) has at least two carbon foam electrodes (54, 56). Each of the electrodes (54, 56) is fitted with a plate (60, 62 respectively) formed from an electrically conductive material. The plate (60, 62) has an underside which is formed so as to be attached to one end of the carbon foam electrode (54, 56). The plate (60, 62) may be fixed to the electrode by crimping or a similar deforming process or may be fitted thereto by an electrically conductive adhesive.

10 Claims, 4 Drawing Sheets

LITHIUM ION BATTERY UTILIZING CARBON FOAM ELECTRODES

BACKGROUND OF THE INVENTION

1. Technical Field

The present invention is directed to high energy lithium ion batteries. More particularly, the present invention is directed to such a high energy density battery which incorporates carbon foam electrodes with each electrode having attached thereto an electrical contact plate.

2. Discussion

The dual graphite lithium battery was originally developed in the early 1980's in an effort to provide a lightweight energy source capable of delivering very high energy density. The driving force behind the development of the lithium ion battery has been for some time the need for a lightweight and rechargeable power source embodying a high energy density for use in small electronic devices such as laptop computers and video cameras.

Additional applications of batteries demonstrating high energy density and light weight are being considered and explored. Specifically, electric vehicle applications are thought to be a promising use of this type of power source.

Electric vehicles, of course, are not new. Electric cars were introduced in the early 20th century which utilized aqueous-electrolyte type lead batteries. Lead batteries were satisfactory then (and remain satisfactory today) with respect to their good rechargeability. Because of the poor weight-to-energy-density ratio of the lead battery, these early electric vehicles proved slow and incapable of long distance operation.

Electric vehicles have traditionally been anachronistic, and, while offering the same modern appearance as their counterparts, have continued to suffer from the lead battery's excessive weight and low energy density.

These problems have forced a shift in research to the lithium battery. Given the demand for a rechargeable secondary battery having an attractive energy density-to-weight ratio, much energy has been expended in studying various types of cells. Rechargeable lithium cells of many varieties have generated much interest. But the results have not been entirely promising. For example, rechargeable, nonaqueous electrolyte cells using lithium metal negative electrodes have presented several problems. Such batteries demonstrate poor fast charging properties and are notorious for their short cycle life. Great concern also exists for the inherent safety of the lithium battery largely the result of the irregular plating of lithium metal as the battery is cycled.

To overcome these problems while providing a power source that has application in electric vehicle technology, rechargeable batteries based on lithium intercalation are being researched. The lithium ion-based secondary cell is a nonaqueous secondary cell. Typically, lithium or a lithium salt is provided as an ion source which is intercalated into a carbon electrode to create a positively charged electrode.

Lithium ion batteries provide several advantages over known lead batteries, such as small self-discharge characteristics and, at least when compared to lead batteries, environmental safety. But the greatest advantage of lithium ion batteries over the known lead battery for vehicle application is attractive energy-density-to-weight ratio. Being lightweight while offering high energy density, the lithium ion battery is thought to have great potential in electric vehicle applications.

The cathode in a conventional lithium ion battery (typically a metal oxide such as $Mn_2O_4$, $CoO_2$, or $NiO$) is doped with lithium. The conventional lithium ion battery uses a lithium salt (typically $LiPF_6$ or $LiClO_4$) dissolved in one or more organic solvents. When dissolved, the salt in the electrolyte is split into the positive ion and negative cation (depending on the salt used). The lithium ambient graphite fiber battery positive ion is intercalated into the carbon anode and the negative ion is intercalated into the carbon cathode.

When a charge is applied to the positive and negative electrodes, the lithium from the cathode is transported from the cathode as an ion and is intercalated into the anode (carbon or lithium metal). Voltage is created by the difference in potential of the positively charged anode and the negatively charged cathode.

On discharge, the process is reversed and lithium ions flow from the anode into the liquid electrolyte as do the negative ions from the cathode. The cell is balanced by equal parts of positive and negative ions absorbed back into the electrolyte.

Since the lithium ion moves from one electrode to the other to store energy the lithium ion battery is commonly known as a "rocking chair battery." The lithium ambient graphite fiber battery uses the same principal of intercalation for the positive electrode (carbon) and uses it again for the negative electrode (carbon). This is in lieu of a lithium doped metal oxide.

The lithium ambient graphite fiber battery is thought to be more attractive in electric vehicle applications. The lithium ambient graphite fiber battery, for example, is safer in principal than the lithium ion battery. In addition, while demonstrating a comparable theoretical energy density to the lithium ion battery, the lithium ambient graphite fiber battery will demonstrate more recharge cycles than a lithium ion battery.

A number of patents have issued which teach the general construction of the lithium ion battery. Such patents include, for example: U.S. Pat. No. 5,631,106, issued on May 20, 1997, to Dahn et al. for ELECTRODES FOR LITHIUM ION BATTERIES USING POLYSILAZANES CERAMIC WITH LITHIUM; U.S. Pat. No. 5,721,067, issued on Feb. 24, 1998 to Dasgupta et al. for RECHARGEABLE LITHIUM BATTERY HAVING IMPROVED REVERSIBLE CAPACITY; U.S. Pat. No. 5,705,292, issued on Jan. 6, 1998 to Fujiwara et al. for LITHIUM ION SECONDARY BATTERY; U.S. Pat. No. 5,677,083, issued on Oct. 14, 1997, to Tomiyama for NON-AQUEOUS LITHIUM ION SECONDARY BATTERY COMPRISING AT LEAST TWO LAYERS OF LITHIUM-CONTAINING TRANSITIONAL METAL OXIDE; U.S. Pat. No. 5,670,277, issued on Sep. 23, 1997, to Barker et al. for LITHIUM COPPER OXIDE CATHODE FOR LITHIUM CELLS AND BATTERIES; U.S. Pat. No. 5,612,155, issued on Mar. 18, 1997, to Asami et al. for LITHIUM ION SECONDARY BATTERY; U.S. Pat. No. 5,595,839, issued on Jan. 21, 1997, to Hossain for BIPOLAR LITHIUM-ION RECHARGEABLE BATTERY; U.S. Pat. No. 5,587,253, issued on Dec. 24, 1996, to Gozdz et al. for LOW RESISTANCE RECHARGEABLE LITHIUM-ION BATTERY; U.S. Pat. No. 5,571,634, issued on Nov. 5, 1996, to Gozdz et al. for HYBRID LITHIUM-ION BATTERY POLYMER MATRIX COMPOSITIONS; U.S. Pat. No. 5,567,548, issued on Oct. 22, 1996, to Margalit for LITHIUM ION BATTERY WITH LITHIUM VANADIUM PENTOXIDE POSITIVE ELECTRODE; U.S. Pat. No. 5,554,459, issued on Sep. 10, 1996, to Gozdz et al. for MATERIAL AND METHOD FOR LOW INTERNAL RESISTANCE LITHIUM ION BATTERY; U.S. Pat. No. 5,547,782, issued Aug. 20, 1996, to Dasgupta et al. for CURRENT COLLOZION FOR LITHIUM ION BATTERY; U.S. Pat. No. 5,496,663, issued on Mar. 5, 1996, to Margalit et al. for LITHIUM VANADIUM PENTOXIDE POSITIVE ELECTRODE; and U.S. Pat. No. 5,478,668, issued on Dec. 26, 1995, to Gozdz et al. for RECHARGEABLE LITHIUM BATTERY CONSTRUCTION.

Also among this group are several patents to McCullough, McCullough et al., or McCullough, Jr. et al. which include: U.S. Pat. No. 4,631,118, issued on Dec. 23, 1986, for LOW RESISTANCE COLLECTOR FRAME FOR ELECTRODONDUCTIVE ORGANIC, CARBON AND GRAPHITIC MATERIALS; U.S. Pat. No. 4,830,938, issued on May 16, 1989, for SECONDARY BATTERY; U.S. Pat. No. 5,503,929, issued Apr. 2, 1996, for LINEAR CARBONACEOUS FIBER WITH IMPROVED ELONGABILITY; U.S. Pat. No. 5,532,083, issued on Jul. 2, 1996, for FLEXIBLE CARBON FIBER ELECTRODE WITH LOW MODULUS AND HIGH ELECTRICAL CONDUCTIVITY, BATTGERY EMPLOYING THE CARBON FIBER ELECTRODE, AND METHOD OF MANUFACTURE; and U.S. Pat. No. 5,518,836, issued May 21, 1996, for FLEXIBLE CARBON FIBER, CARBON FIBER ELECTRODE AND SECONDARY ENERGY STORAGE DEVICES.

Particularly, the graphite component has taken on a variety of forms as evidenced by the prior art. For example, a supercapacitor based on carbon foams has been illustrated in U.S. Pat. No. 5,260,855, issued on Nov. 9, 1993, to Kaschmitter et al.x While generally improving the state of the art, known battery designs incorporating carbon foam electrodes have not eliminated the need for a practical lithium battery construction.

SUMMARY OF THE INVENTION

It is an object of the present invention to provide a lithium ion battery incorporating carbon foam electrodes.

A further object of the invention is to provide a practical electrical contact on each of the carbon foam electrodes.

Another object of the invention is to provide an electrical contact having a channel formed therein for placement on and partially around an end of the carbon foam electrode.

Other objects and advantages will become apparent from the following detailed description and accompanying drawing. Basically, the invention comprises a battery having at least two carbon foam electrodes. Each of the electrodes is fitted with a plate formed from an electrically conductive material. The plate has an underside which is formed so as to be attached to one end of the carbon foam electrode. The plate may be fixed to the electrode by crimping or a similar deforming process.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the view, and in which.

DETAILED DESCRIPTION OF THE PREFERRED EMBODIMENT

The drawings disclose the preferred embodiment of the present invention. While the configurations according to the illustrated embodiment are preferred, it is envisioned that alternate configurations of the present invention may be adopted without deviating from the invention as portrayed. The preferred embodiment is discussed hereafter.

Figure 1:
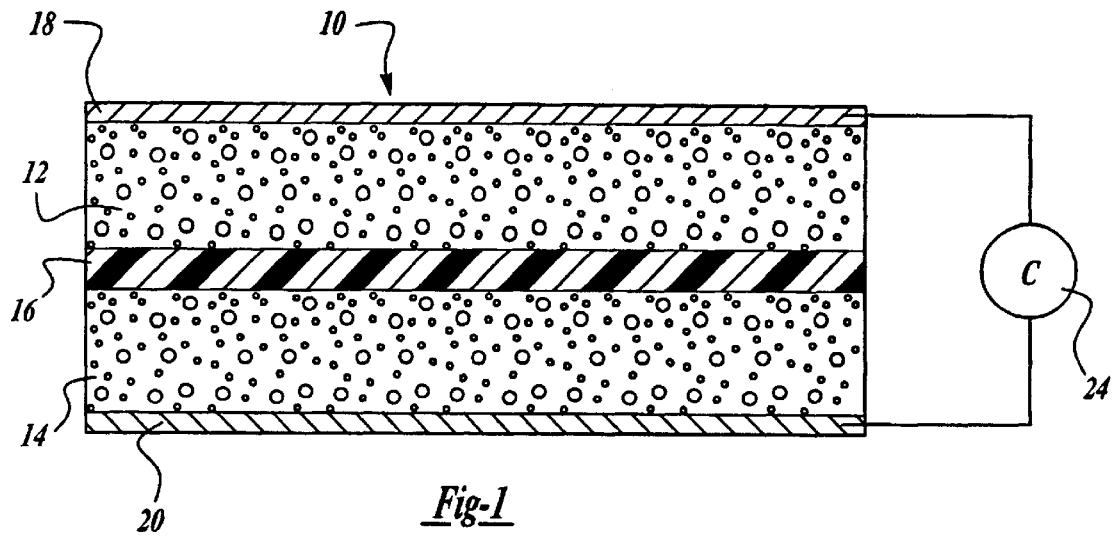
FIG. 1 is a schematic illustration of a battery having carbon foam electrodes according to the present invention.

FIG. 1 illustrates a schematic of an exemplary battery having carbon foam electrodes, the battery being generally illustrated as 10, formed according to the present invention. The battery 10 includes a pair of spaced carbon foam electrodes 12, 14, separated by an electrode separator 16. A pair of spaced electrical contacts 18, 20 provide an electrical connection with an electrically driven component 24. The separator 16 may be made of a polymerized material such as polypropylene, Teflon (registered trademark), or nylon.

A variety of carbon foam materials may be used in the present invention. The preferred foams have porosities of between 10 and 100 ppi, although other porosities might be used. An exemplary but not limiting foam is produced by Oak Ridge Natinoal Laboratory's Metals and Ceramics Division. Such typical properties include a micrographic porosity (ppi) of 58.8, an ash content of 0.39 (weight percent at 1000 degrees centigrade), a bulk density of 0.042 (g/cm$^3$), a ligament density of 1.538 (g/cm$^3$), a surface area of 1.623 (m2/g), a resistivity of 0.75 (ohm-cm), and a specific heat of 0.30 (cal/g/degrees centigrade). The maximum usable temperature in air is 350 degrees centigrade, while the maximum usable temperature in an inert environment is 3500 degrees centigrade. Such materials demonstrate a thermal expansion of 1.15 (ppm/degree centigrade) at 0–200 degrees centigrade, 1.65 (ppm/degree centigrade) at 0–500 degrees centigrade, and 1.65 (ppm/degree centigrade) at 0–1000 degrees centigrade. Importantly, these samples demonstrated the following thermal conductivities: 0.085 (W/m-K) at 200 degrees centigrade, 0.125 (W/m-K) at 300 degrees centigrade, 0.180 (W/m-K) at 400 degrees centigrade, 0.252 (W/m-K) at 500 degrees centigrade, 0.407 (W/m-K) at 650 degrees centigrade, and 0.625 (W/m-K) at 800 degrees centigrade.

The selected carbon foams are very strong and retain their shapes. For example, the tested foams demonstrated compressive strengths (at 20 degrees centigrade) of 625 kPa with a 10 percent deflection and 763 kPa with ultimate deflection. The tested foams also demonstrated shear strength (at 20 degrees centigrade) of 290 kPa and tensile strength (also at 20 degrees centigrade) of 810 kPa. Flexure strength (at 20 degrees centigrade) was demonstrated as being 862 kPa while a flexure modulus of 58.6 (MPa) was shown. Of course, other foams including other silicon carbide foams might be used having different characteristics while still falling within the spirit and scope of the present invention.

Figure 2:
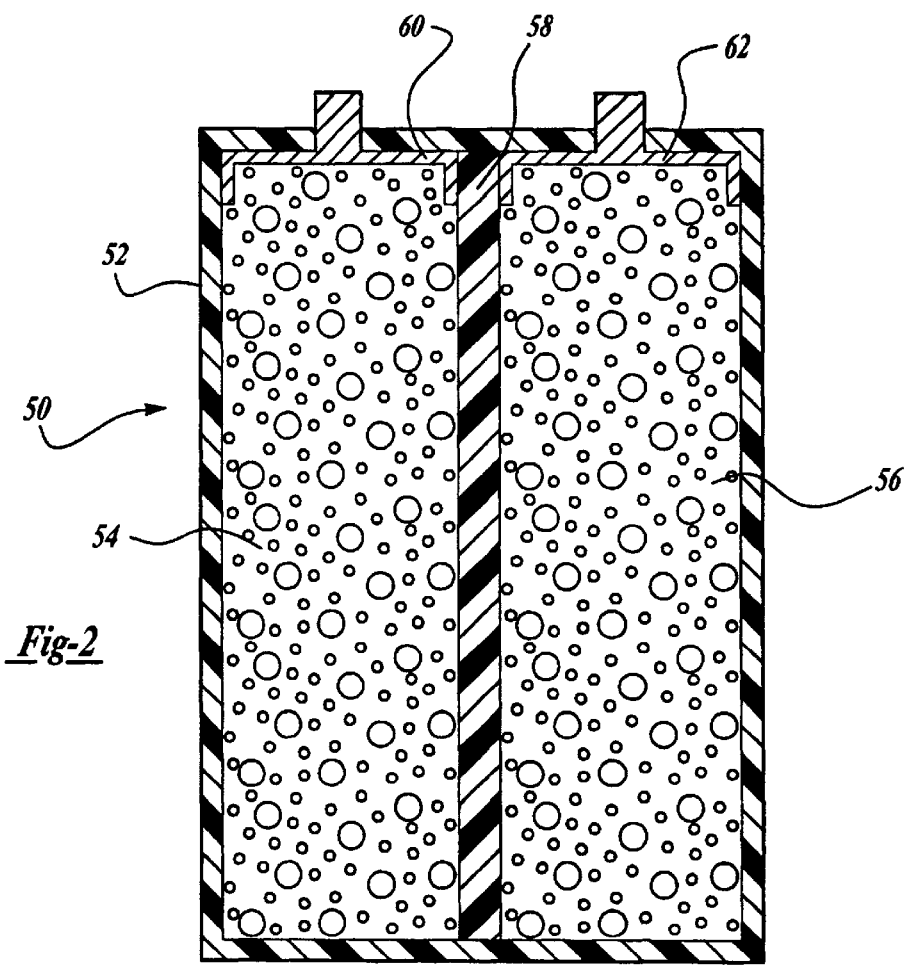
FIG. 2 is a sectional view of a dual carbon foam electrode battery according to its preferred embodiment.

FIG. 2 is a sectional view of a dual carbon foam electrode battery, generally illustrated as 50, constructed according to its preferred embodiment of the present invention. The battery 50 includes a case or housing 52 made of a known structurally rigid material such as rubber or plastic. A pair of spaced carbon foam electrodes 54, 56 is positioned within the hollow defined by the body 52. The electrodes 54, 56 are composed of open-cell carbon foam having selected porosity. The porosity is selected so as to provide a specific amount of surface area. The spectrum of pore size is relatively broad and includes a possible range of from between 10 and 500 pores per inch (ppi).

An electrode separator 58 is positioned between the electrodes 54, 56. The separator electrically insulates the electrodes 54, 56 from the nonionic conduction of electricity.

At one end of each of the electrodes 54, 56 is fitted with electrical contacts 60, 62, respectively. The contacts 60, 62 provide electrical energy to an external component to be driven by the battery 50. Preferably the contacts 60, 62 are composed of a highly conductive material such as copper, although other conductive metals such as brass or aluminum may be used as well.

Liquid electrolytes conventionally used in Li-ion batteries contain organic solvents and conducting salts. The organic solvents are generally carbonates. Probably the most commonly used conducting salt is lithium hexafluorophosphate (LiPF$_6$), although other commonly-used salts include LiBF$_4$, LiAsF$_6$ and LiClO$_4$.

Figure 3:
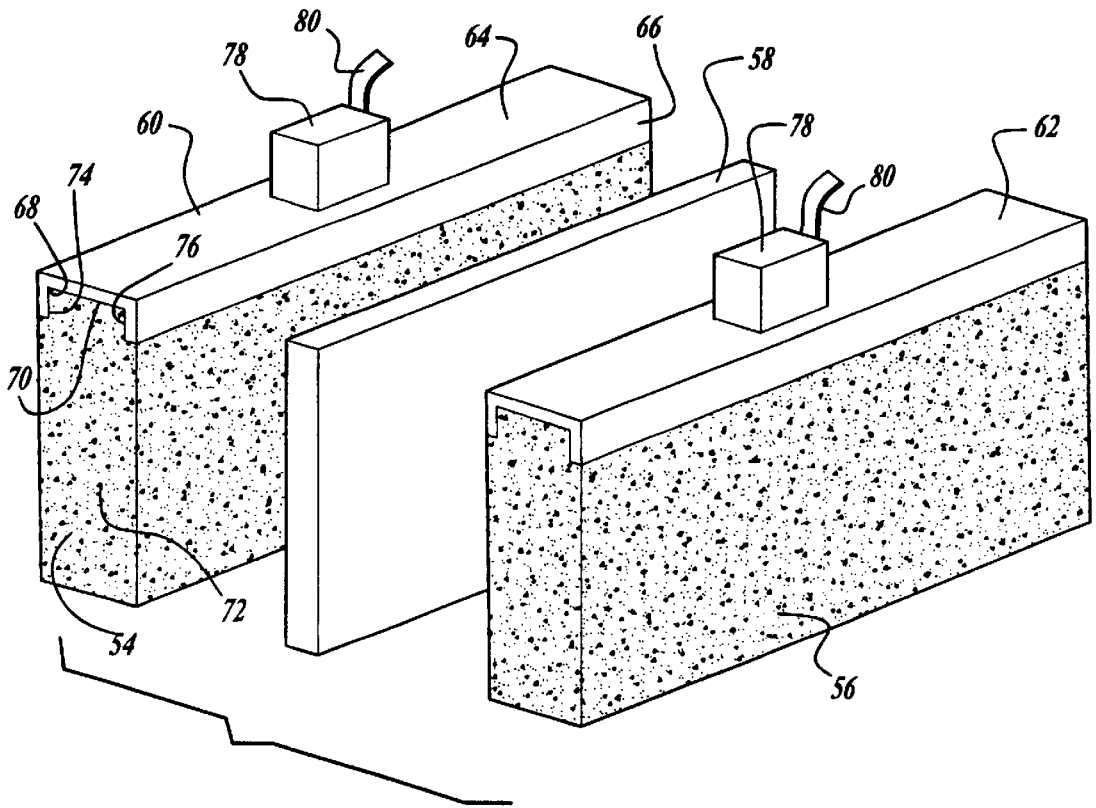
FIG. 3 is a perspective view of a pair of carbon electrodes separated by an electrode separator and spaced apart therefrom.

FIG. 3 is a perspective view of the pair of carbon electrodes 54, 56 separated by the electrode separator 58. The electrode contact plate 60 includes a top wall 64 and a pair of opposing, spaced apart side walls 66, 68. A channel 70 is defined by the top wall 64 and the pair of spaced apart side walls 66, 68. The channel 70 is mated with one end 72 of the carbon foam electrode 54. Preferably, a pair of opposed side channels 74, 76 (seen more clearly in FIG. 4, discussed below) are defined along the upper end sides of the electrode 54 for mating with the channel 70. An extended rigid contact point 78 is provided for external application of electrical power. While FIG. 3 (and FIG. 4, discussed below) illustrate the contact point 78 as being positioned generally in the middle of the upper side of the electrode contact plates 60, 62, the contact point 78 may be positioned at, for example, the approximate ends of the plates 60, 62. As an alternative or as a supplement, a flexible contact lead 80 composed of a material such as a copper mesh may be fitted for external engagement.

According to the embodiment of FIG. 3, the sidewalls 66, 68 of the contact plate 60 may be pinched inwardly toward one another upon the foam electrode 54 (or 56) to mechanically grip the electrode's upper end.

Figure 4:
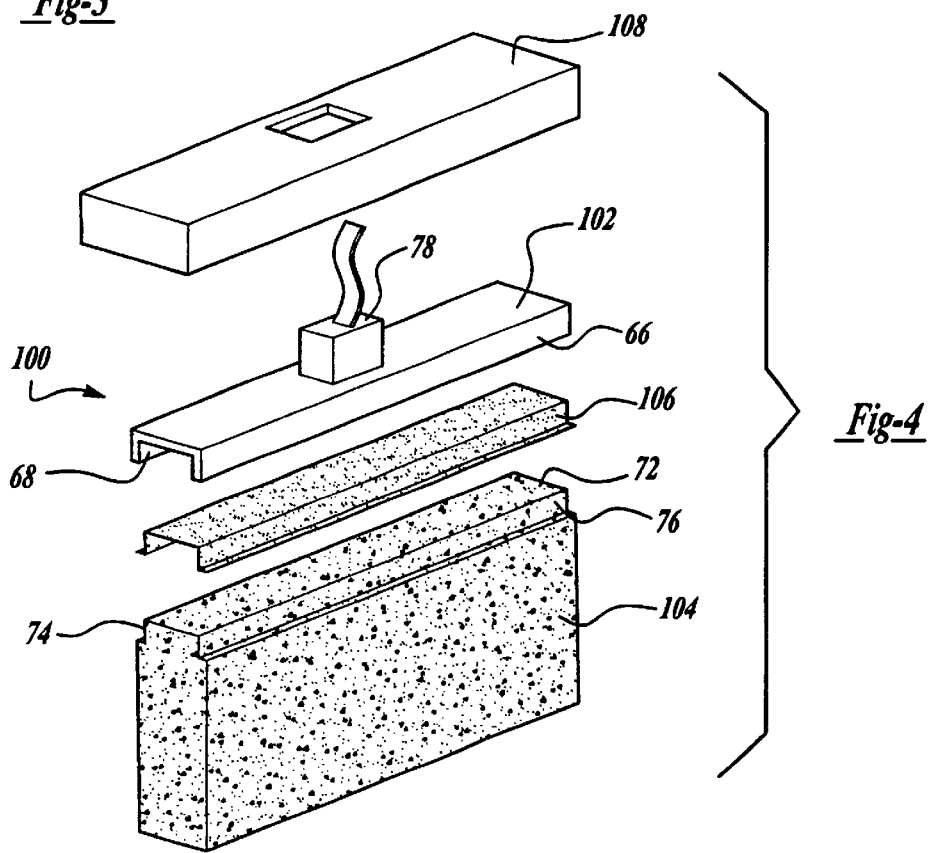
FIG. 4 is a perspective view of a single electrode according to an alternate embodiment of the present invention illustrating the contact plate in spaced apart relation with respect to the carbon foam electrode.

FIG. 4 is a perspective view of an alternate embodiment of an electrode assembly, generally illustrated as 100, according to the present invention. The electrode 100 includes a contact plate 102 in spaced apart relation with respect to a carbon foam electrode 104. (Although only one electrode 100 and one contact plate 102 is illustrated, the other electrode [not shown] and the other contact plate [also not shown] is substantially the same.)

An adhesion layer 106 may be provided between the carbon foam electrode 104 and the contact plate 102. The layer 106 is used in lieu of (or as a supplement to) the mechanical method of attaching the plate to the electrode discussed above with respect to FIG. 3. The adhesion layer 106 is to be composed of an electrically conductive material which demonstrates adhesive properties. Such materials might be nickel, silver, copper, aluminum or any electro-coated material demonstrating both adhesive and conductive properties.

As a possible addition, a polymeric insulating layer 108 may be provided to seal the contact plate 102. The insulating layer 108 should be composed of a polycarbonate or may be composed of any organic material suitable for the purpose.

Figure 5:
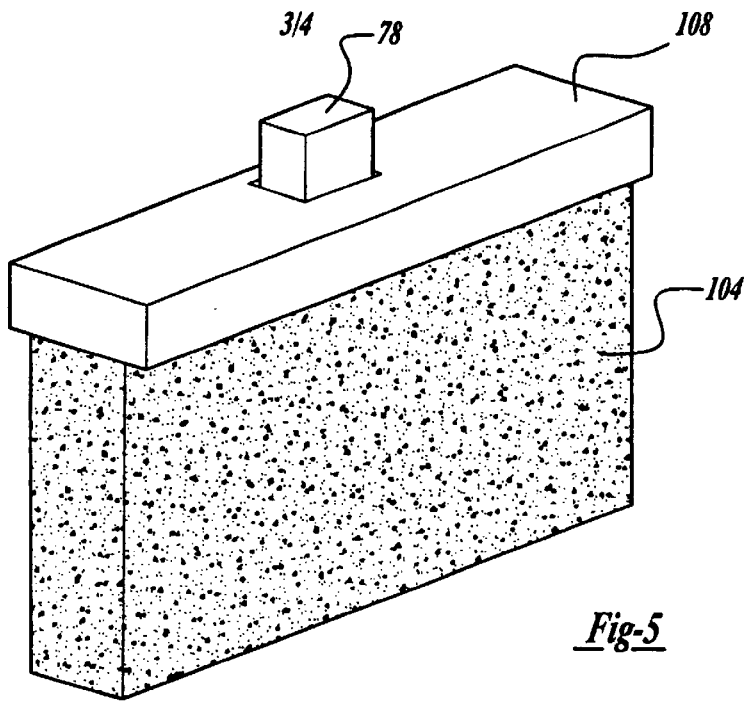
FIG. 5 is a perspective view of the single electrode of FIG. 4 illustrated as an assembly.

FIG. 5 is a perspective view of the electrode assembly 100. As illustrated, the insulating layer 108 essentially forms an insulating cap over the top end of the assembly 100.

Figure 6:
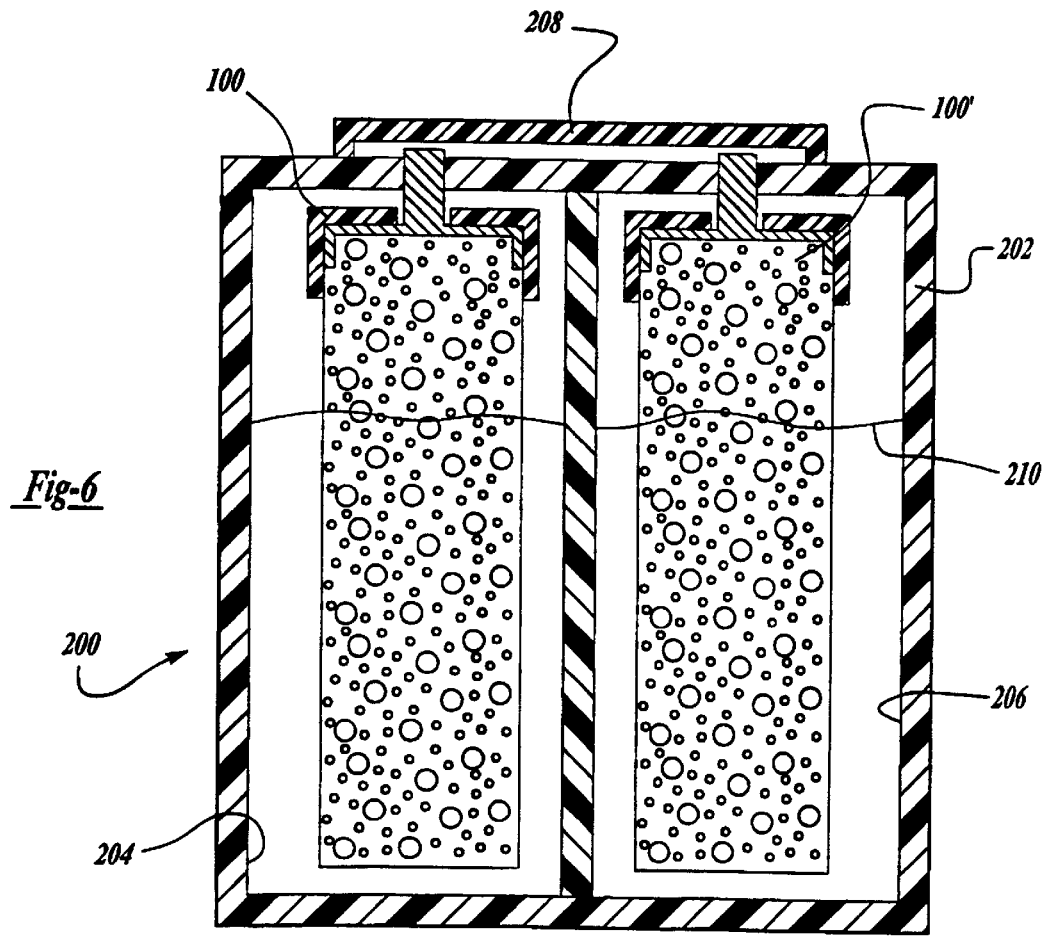
FIG. 6 is a cross-section of a dual carbon foam electrode battery according to the present invention.

FIG. 6 is a cross-section of a dual carbon foam electrode battery, generally illustrated as 200, according to the present invention. The battery 200 includes a battery case 202 which includes two cells 204, 206. Two electrode assemblies of the type shown in FIGS. 4 and 5 and discussed with respect thereto, shown here as 100, 100', are positioned one each in the cells 204, 206. An electrolyte solution is provided within the battery 200 approximately up to the illustrated level 210. Preferably the level of the electrolyte is below the lower end of the insulative layer 108. A cap 208 is preferably provided to seal the upper ends of the electrodes 100, 100' which extend outside of the battery case 202.

Figure 7:
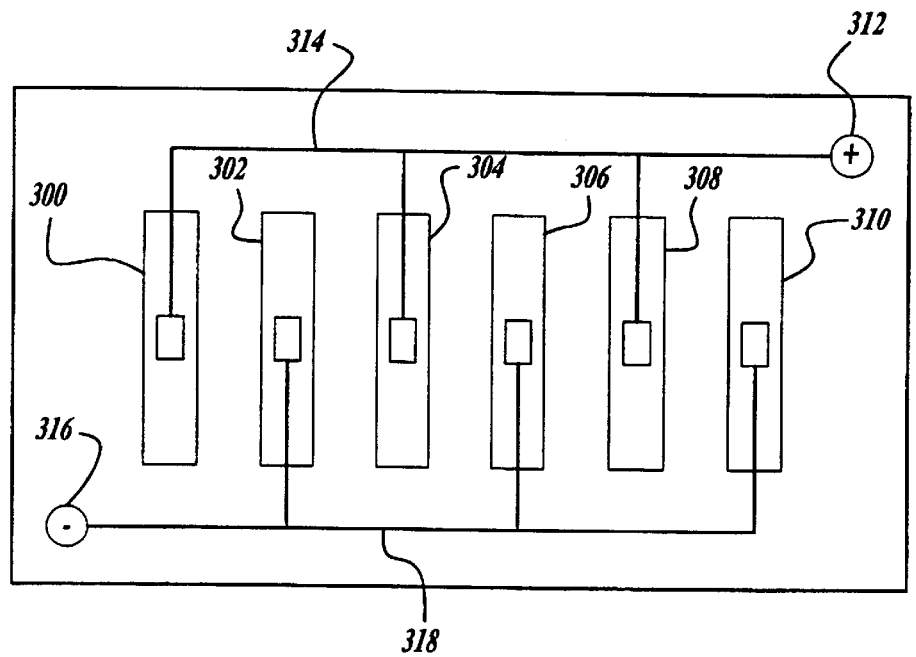
FIG. 7 is a schematic of an alternate arrangement of electrodes within a battery case.

It should be understood that while two electrode-filled cells are illustrated, an array of many cells such as six, ten, or twenty-four may be substituted therefor. Such an array is illustrated in FIG. 7 which is a schematic representation of a battery according to the present invention. As illustrated, six cells 300, 302, 304 306, 308, 310 are illustrated. The cells 300, 304, 308 are conductively connected to a common positive pole 312 by a common line 314, while the cells 302, 306, 310 are conductively connected to a common negative pole 316 by a common line 318.

Figure 8:
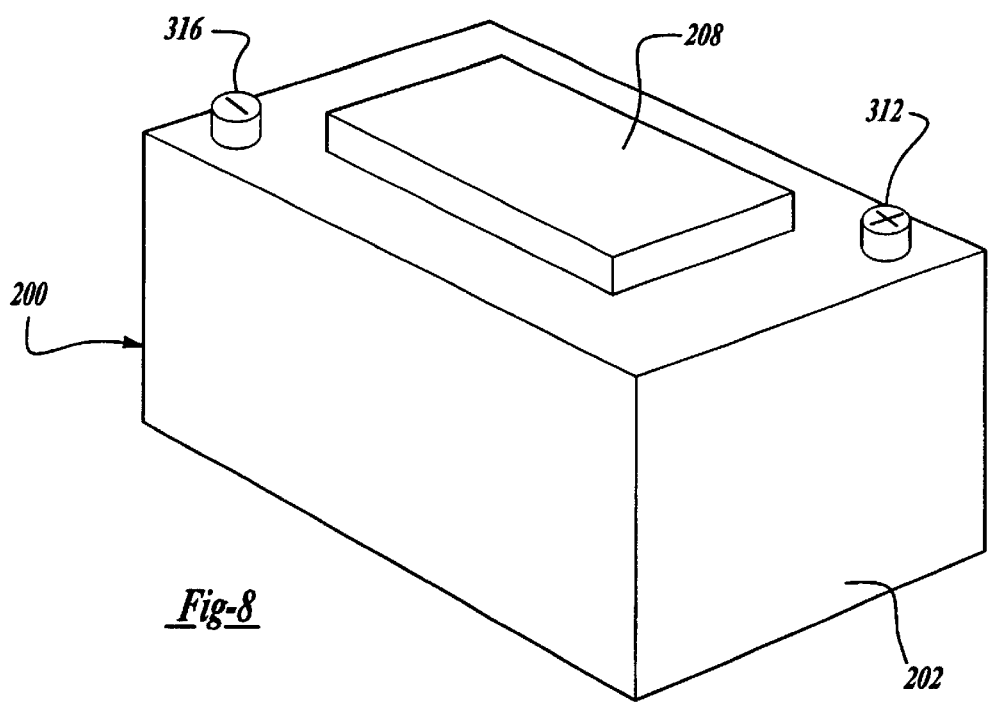
FIG. 8 is a perspective view of a battery incorporating a plurality of electrodes according to a preferred embodiment of the present invention.

FIG. 8 is a perspective view of the battery 200 housing the plural array electrodes of FIG. 7. Of course, alternate configurations of the battery design, such as shape and size, may be provided.

Those skill in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A lithium battery comprising:

a battery case;

at least one carbon foam electrode having a top end, a first side and a second side;

an electrically conductive plate fitted to said top end of said at least one carbon foam electrode, said plate having a top and a first side and a second side extending from said top, said first side extending at least partially along said first side of said carbon foam electrode and said second side extending at least partially along said second side of said electrode.

2. The lithium battery of claim 1 including an electrolyte solution provided in said battery case.

3. The lithium battery of claim 1 further including a conductive adhesive material fitted between said carbon foam electrode and said plate.

4. The lithium battery of claim 1 in which said plate includes a contact pole provided on its upper side.

5. The lithium battery of claim 1 further including an insulative later provided at least partially over said plate and at least partially over said carbon foam electrode.

6. The lithium battery of claim 5 wherein said insulative layer is composed of a polycarbonate material.

7. The lithium battery of claim 5 wherein said insulative layer is composed of an organic material.

8. The lithium battery of claim 1 wherein said battery includes at least four carbon foam electrodes.

9. The lithium battery of claim 1 wherein said carbon foam electrode has a porosity of between 10 and 100 ppi.

10. The lithium battery of claim 1 wherein said carbon foam electrode is silicon carbide foam.

* * * * *